United States Patent
Karnjate et al.

(10) Patent No.: US 8,255,103 B2
(45) Date of Patent: Aug. 28, 2012

(54) ELECTRONIC BRAKE SYSTEM PEDAL RELEASE TRANSITION CONTROL APPARATUS AND METHOD

(75) Inventors: Timothy M. Karnjate, Grand Blanc, MI (US); William K. Manosh, Lancaster, CA (US)

(73) Assignee: GM Global Technology Operations LLC, Detroit, MI (US)

(*) Notice: Subject to any disclaimer, the term of this patent is extended or adjusted under 35 U.S.C. 154(b) by 1017 days.

(21) Appl. No.: 12/042,094

(22) Filed: Mar. 4, 2008

(65) Prior Publication Data
US 2008/0243323 A1 Oct. 2, 2008

Related U.S. Application Data

(60) Provisional application No. 60/908,319, filed on Mar. 27, 2007.

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| G06F 7/70 | (2006.01) |
| G06F 19/00 | (2006.01) |
| G06G 7/00 | (2006.01) |
| G06G 7/76 | (2006.01) |

(52) U.S. Cl. .......... 701/22; 701/70
(58) Field of Classification Search ............ 701/22, 701/70; 188/137, 138; 303/20, 154, 155; 903/947
See application file for complete search history.

(56) References Cited

U.S. PATENT DOCUMENTS

| | | | | |
|---|---|---|---|---|
| 3,921,502 | A | * | 11/1975 | Lauer et al. ............... 91/391 R |
| 4,784,442 | A | * | 11/1988 | Petersen ........................ 303/15 |
| 5,954,407 | A | * | 9/1999 | Schramm et al. ............ 303/155 |
| 6,002,980 | A | * | 12/1999 | Taylor et al. .................. 701/110 |
| 6,007,160 | A | * | 12/1999 | Lubbers et al. ............. 303/114.1 |
| 6,099,086 | A | | 8/2000 | Feigel et al. |
| 6,142,581 | A | * | 11/2000 | Yamaguchi et al. ....... 303/113.2 |
| 6,212,459 | B1 | * | 4/2001 | Unterforsthuber ............. 701/70 |
| 6,226,586 | B1 | * | 5/2001 | Luckevich et al. ............ 701/70 |
| 6,390,565 | B2 | * | 5/2002 | Riddiford et al. ................ 303/3 |

(Continued)

FOREIGN PATENT DOCUMENTS

DE 19610522 A1 9/1997

(Continued)

*Primary Examiner* — John Nguyen
*Assistant Examiner* — Michael Whalen
(74) *Attorney, Agent, or Firm* — Quinn Law Group, PLLC

(57) ABSTRACT

A vehicle is provided having a brake pedal with a detectable travel position and apply force, an electronic braking system component, and a controller having a stored threshold braking force and an algorithm. The algorithm determines a first braking torque request corresponding to the apply force, and a second braking torque request corresponding to the travel position. The first request applies when the apply force is greater than the threshold, and the second request applies when it is not. A calculated third request transitions linearly to the second request when apply pressure drops below the threshold upon pedal release. A method is also provided that includes recording the apply force, travel position, and force and travel-based tables, comparing the apply force to the threshold, applying the braking system component using the force-based table when the apply force exceeds the threshold, and otherwise using a calculated braking torque and travel-based table.

10 Claims, 3 Drawing Sheets

U.S. PATENT DOCUMENTS

| | | | |
|---|---|---|---|
| 6,457,785 B1 * | 10/2002 | Yonemura et al. | 303/182 |
| 6,618,660 B2 * | 9/2003 | Walenty et al. | 701/71 |
| 6,669,310 B2 * | 12/2003 | Obuchi | 303/155 |
| 6,728,621 B1 * | 4/2004 | Walenty et al. | 701/71 |
| 7,747,371 B2 * | 6/2010 | Eriksson et al. | 701/51 |
| 7,805,232 B2 * | 9/2010 | Karnjate et al. | 701/70 |
| 2004/0251095 A1 * | 12/2004 | Simard et al. | 188/156 |
| 2005/0046272 A1 * | 3/2005 | Rieth et al. | 303/113.4 |
| 2006/0163942 A1 * | 7/2006 | Tsunehara et al. | 303/155 |
| 2007/0299593 A1 * | 12/2007 | Karnjate et al. | 701/70 |
| 2008/0143177 A1 * | 6/2008 | Bernzen et al. | 303/115.2 |
| 2008/0208418 A1 * | 8/2008 | Eriksson et al. | 701/51 |
| 2008/0270000 A1 * | 10/2008 | Bernzen | 701/79 |
| 2008/0306667 A1 * | 12/2008 | Karnjate et al. | 701/70 |
| 2009/0099744 A1 * | 4/2009 | Karnjate et al. | 701/70 |
| 2009/0099745 A1 * | 4/2009 | Karnjate et al. | 701/70 |
| 2009/0105919 A1 * | 4/2009 | Karnjate et al. | 701/70 |
| 2009/0296106 A1 * | 12/2009 | Donaldson | 358/1.9 |

FOREIGN PATENT DOCUMENTS

| | | |
|---|---|---|
| DE | 10141547 A1 | 6/2002 |
| EP | 0964804 B1 | 10/2006 |

* cited by examiner

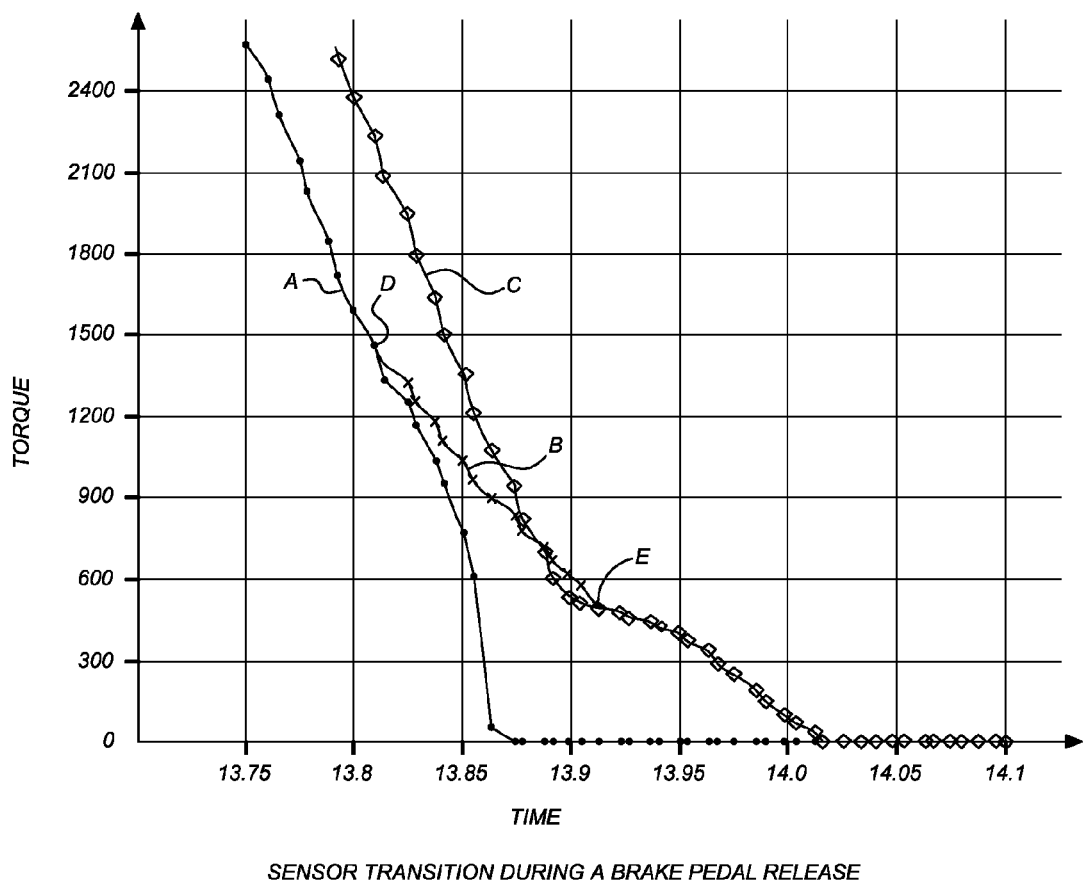

ELECTRONIC BRAKE SYSTEM PEDAL RELEASE TRANSITION CONTROL APPARATUS AND METHOD

CROSS REFERENCE TO RELATED APPLICATION

This application claims the benefit of U.S. Provisional Patent Application No. 60/908,319, filed Mar. 27, 2007, and which is hereby incorporated by reference in its entirety.

TECHNICAL FIELD

The present invention relates generally to a brake pedal sensor transition control apparatus and method of use with a vehicle having an electronic braking system, and in particular to a vehicle having a controller with brake pedal transition logic for interpolating or transitioning between separate force-based and travel-based braking torque sensor requests during brake pedal release, thereby optimizing the performance and feel of the brake pedal.

BACKGROUND OF THE INVENTION

Conventional automotive vehicles typically include a mechanical brake pedal that is continuously connected to a brake lever or arm. The motion of the arm in turn actuates a braking mechanism, such as a disc brake and/or drum brake, to thereby slow or stop the vehicle. The rate of deceleration imparted to the vehicle depends largely on the amount of force applied to depress the brake pedal, as well as the travel position of the brake pedal within or along its fixed range of motion. Conventional hydraulic braking systems are powered by a supply of pressurized brake fluid from a master cylinder. Such a mechanical, fluid-driven braking system generally responds relatively quickly and accurately to the force applied to the brake pedal through its entire range of motion, providing what could be described as a "normal" or conventional brake pedal feel.

By contrast, an electronic or by-wire braking system is often used in electric vehicles, as well as in hybrid vehicles which are alternately and selectively powered by an internal combustion engine and one or more electric motor/generators. In an electronic braking system (EBS), the braking command or input applied as a force to a brake pedal by an operator is converted by an encoder device into an electrical signal. This electrical braking signal, also known as a braking torque request, is then transmitted or communicated to the point of application, wherein one or more actuators operate in response to the signal to slow or stop the vehicle. Braking torque may be applied directly using a conventional braking mechanism, or more commonly by applying an individual electronic braking unit positioned in proximity to each wheel, and/or to the transmission output member, thereby slowing the vehicle in a precisely controlled manner.

In an electric or hybrid vehicle, the brake pedal is isolated from the point of braking torque application, and therefore is attached to one or more pedal sensors which detect or measure the pressure on the brake pedal and convert the pressure into the transmittable electrical signal. The controller has preprogrammed braking system logic for translating the detected brake pedal measurements into corresponding braking torque requests. Typically, such braking logic includes an accessible braking torque lookup table containing specific braking torque requests corresponding to the various detected brake pedal forces.

However, certain pressure sensors may have less than optimal resolution, particularly under low force conditions. Using a brake pedal force sensor alone under these conditions may result in an error or variance in the braking torque request communicated to the electronic braking system when compared to the vehicle operator's intended braking force. While sensors used to measure a brake pedal's relative position within or along its range of motion, i.e., the brake pedal travel position, generally have better resolution at these low pressure ranges, hysteresis within the braking system may also potentially lead to errors or variances in the resulting applied braking torque request in the event of an attempted direct or immediate switch to such a sensor during low pressure applications.

SUMMARY OF THE INVENTION

Accordingly, a vehicle is provided having a brake pedal and an electronic braking system component that is configured to slow or stop the vehicle in response to a detected apply force applied to a brake pedal, and a detected travel position of the brake pedal. The vehicle also includes a controller having a braking system control algorithm which determines a first braking torque request corresponding to the detected apply force and a second braking torque request corresponding to the detected travel position. The braking system is applied using the first braking torque request when the detected apply force is greater than a stored threshold braking force, and using the second braking torque request when the detected apply force is less than the stored threshold braking force.

A pair of braking torque lookup tables are accessible by the controller to determine a corresponding one of the first and second braking torque requests, with the lookup tables including a force-based table providing the first braking torque request, and a travel-based table providing the second braking torque request. The braking system component is then applied using only a calculated third braking torque request when the detected apply force drops below the stored threshold braking force upon release of the brake pedal, with the braking system switching to the second braking torque request only when the third braking torque request equals the second braking torque request, thereby smoothly transitioning between the force-based and travel position-based braking torque requests.

The third braking torque request is selected from a point along a calculated linearized curve between the first and second braking torque requests, and neither of the first or second braking torque requests is executed when a separate panic braking condition is detected.

A brake pedal sensor transition method is also provided for use with a hybrid vehicle having an electronic braking system component and a brake pedal. The method includes recording an applied braking force and travel position of the brake pedal, accessing a force-based braking torque lookup table corresponding to a first braking torque request, and accessing a separate travel position-based braking torque lookup table corresponding to a second braking torque request. The method further includes comparing the recorded braking force to a threshold value, and applying the braking system component using the force-based table when the braking force exceeds the threshold value, and using the travel-based table when the braking force is less than the threshold value.

The braking system component is applied according to a calculated transition braking torque, until the transition braking torque is equal to a corresponding braking torque value from the travel position-based braking torque lookup table.

Calculating the transition braking torque includes performing a least squares linearization method to generate a linearized torque transition curve between a torque value point selected from the force-based braking torque lookup table and a torque value point selected from the travel position-based braking torque lookup table.

A method of interpolating a driver-requested braking torque request includes calculating a first braking torque request using a detected pedal force, determining a second braking torque request using a detected pedal travel position, and saving the first braking torque request as a linearization entry point for transitioning to the second brake torque request. The method further includes setting a linearization exit point equal to the corresponding second braking torque request, interpolating a third braking torque request between the entry and exit points, and applying the braking system component using the third braking torque request until the third braking torque request is equal to the exit point.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic curve showing the brake pedal transition of the invention during a brake pedal release.

DESCRIPTION OF THE PREFERRED EMBODIMENTS

Figure 1:
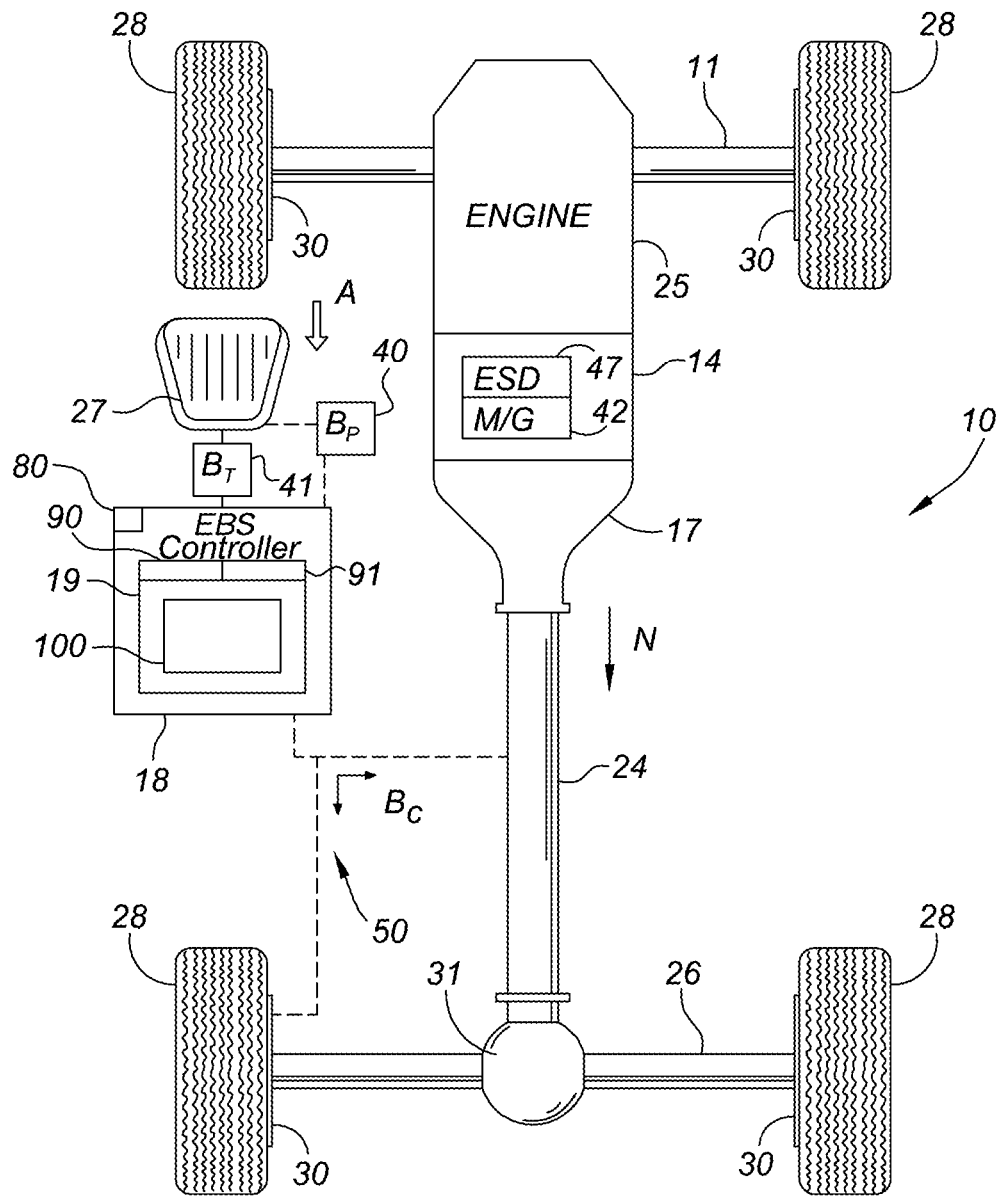
FIG. 1 is a schematic representation of a vehicle chassis having a controller with brake pedal transition logic according to the invention.

Referring to the drawings wherein like reference numbers correspond to like or similar components throughout the several figures, there is shown in FIG. 1 a vehicle 10 having a plurality of wheels 28, an electronic braking system control unit or controller 18, and an engine 25 that is selectively connectable to a transmission 17 having a rotatable output member 24. The vehicle 10 is preferably a hybrid vehicle having an alternate power supply 14 including an energy storage device (ESD) 47, such as a rechargeable battery or battery pack, and at least one electric motor/generator 42 operable for alternately powering or propelling the vehicle 10 and/or one or more of its various subsystems. However, the vehicle 10 may be any vehicle utilizing an electronic braking system (EBS) controller 18 as described herein, such as an electric vehicle or a fuel-cell powered vehicle.

The EBS controller 18, referred to hereinafter for simplicity as the controller 18, is operable for detecting a braking force (arrow A) applied to a brake pedal 27 using a pair of brake pedal sensors 40 and 41 connected thereto. The controller 18 calculates or otherwise determines a corresponding braking torque request ($B_C$) in response to the detected and recorded measurements or readings. The controller 18 then communicates a braking torque request ($B_C$) to an individual electronic braking unit 30 positioned in proximity to each of the wheels 28 and/or to the output member 24 by-wire and/or via datalink. The braking torque request ($B_C$) is transmitted across one or more command signal transmission channels or lines 50 to the electronic braking unit 30 and/or the output member 24, where the braking torque request ($B_C$) can act to oppose the torque of the electronic braking unit 30 and/or the output member 24 to slow or stop the vehicle 10 as needed.

Depending on the specific drive configuration of the vehicle 10, the output member 24 may be driveably connected to a rear differential 31, which is configured to distribute rotational force or torque from a rotatable output member 24, such as a driveshaft, to rear drive axle 26 for powering or driving a plurality of wheels 28 at the rear of the vehicle 10. Although not shown in FIG. 1, the vehicle 10 may also have a substantially similar front differential suitable for distributing torque to the front drive axle 11 for powering or driving a plurality of wheels 28, such as in a four-wheel or all-wheel drive configuration. The transmission 17 is configured to deliver a variable transmission output speed N to the output member 24, with the transmission output speed N being variably opposable by the braking request ($B_C$), as determined by the controller 18.

Controller 18 includes programmable memory 19 and a microprocessor 80 configured to rapidly execute the necessary control logic for implementing and controlling the electronic braking units 30 and/or the output member 24 as needed, using a brake pedal transition logic method or algorithm 100 (see FIG. 2) which is programmed or stored in memory 19. The controller 18 is electrically connected, whether directly by-wire or indirectly via datalink signal as described hereinabove, to a brake pedal travel sensor 41 and a brake pedal pressure or force sensor 40, each of which are in electric communication with brake pedal 27.

Travel sensor 41 (also labeled $B_T$ in FIG. 1) is preferably a pedal range sensor configured or adapted to precisely detect, measure, or otherwise determine the relative position of the brake pedal 27 along a fixed range of motion when the brake pedal 27 is depressed or actuated. Pressure or force sensor 40 (also labeled $B_P$ in FIG. 1) is preferably a pressure transducer or other suitable pressure sensor configured or adapted to precisely detect, measure, or otherwise determine an apply pressure or force (arrow A) imparted to the brake pedal 27 by an operator of the vehicle 10. The measurements or readings taken by travel sensor 41 and force sensor 40 are transmittable or communicable to the controller 18 or are otherwise determinable thereby as needed for use with the algorithm 100 of the invention, which is described in further detail later hereinbelow.

Memory 19 of the controller 18 is preloaded or preprogrammed with a pair of lookup tables 90 and 91, which are braking torque data tables readily accessible by controller 18 in implementing or executing algorithm 100. Lookup table 91, referred to hereinafter for clarity as travel table 91, corresponds to the measurements or readings of travel sensor 41 and contains a commanded braking torque request ($B_C$) appropriate for the detected position of travel sensor 41. Likewise, the lookup table 90, referred to hereinafter as the force table 90, corresponds to the recorded measurements or readings of force sensor 40 and contains a commanded braking torque request ($B_C$) appropriate for the detected force measurement as determined by the force sensor 40.

Controller 18 preferably normally operates according to the force table 90, and force table 90 therefore acts as the preferred or default table. However, as described previously hereinabove, pressure or force sensors such as the force sensor 40 tend to have relatively low resolution under low apply pressure conditions, while travel sensors such as travel sensor 41 do not typically share these particular limitations. Therefore, travel table 91 is preferably selectively used in place of force table 90 during periods of low force resolution in order to avoid a perceptible discontinuity or variance between the braking torque request ($B_C$) and the operator's intended braking force. Discontinuity may result from hysteresis or lag in response time in the various components comprising the electronic braking system, and therefore skipping or transitioning instantaneously between the travel table 91 and the force table 90 may result in a less than optimal braking performance.

Figure 2:
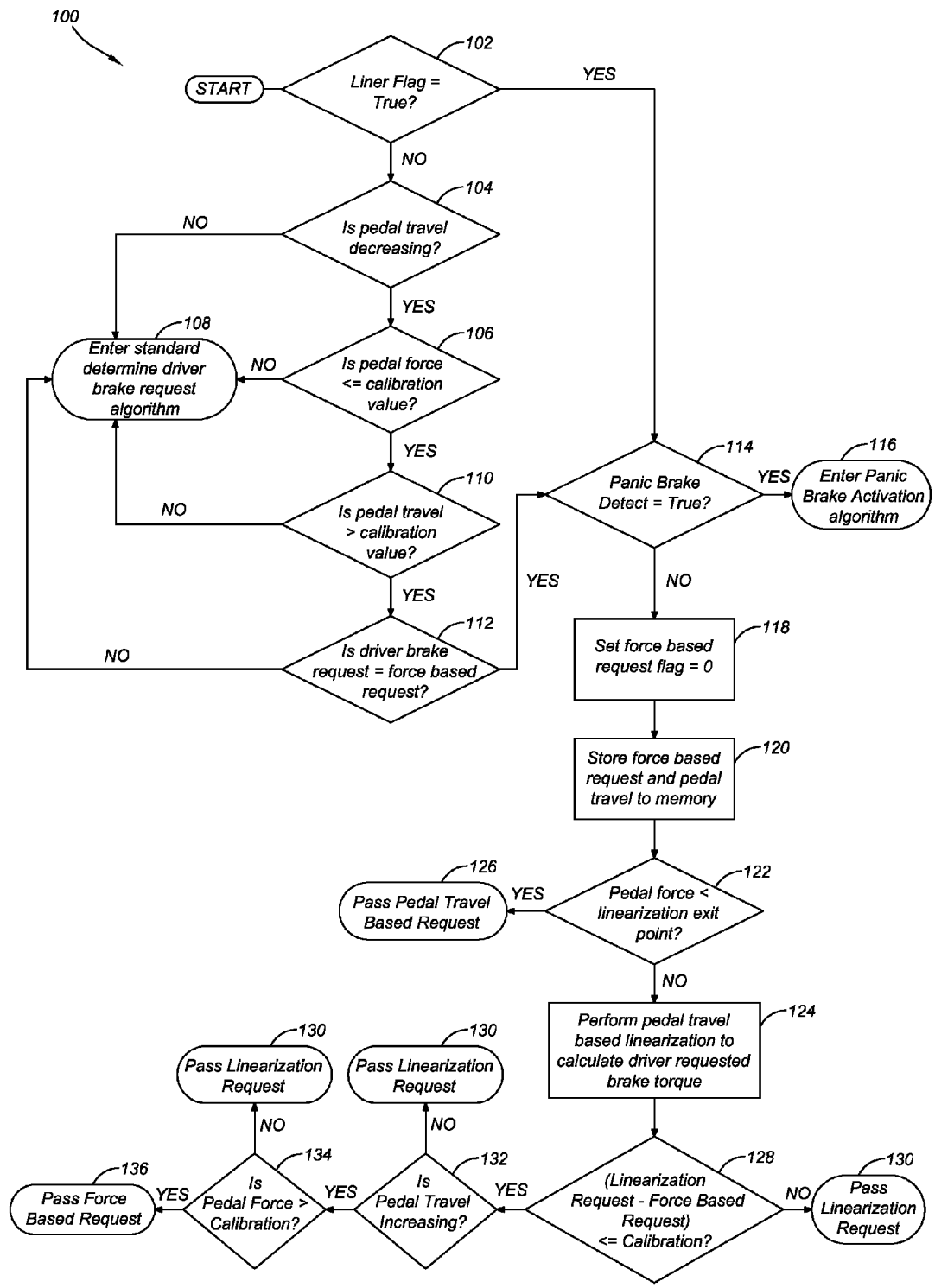
FIG. 2 is a flow chart describing the method or algorithm of the invention for interpolating or transitioning between brake pedal pressure and travel position lookup tables.

Accordingly, turning to FIG. 2, the algorithm 100 is provided to interpolate and smoothly transition from force table 90 to the travel table 91 during these periods of low force resolution, such as would occur upon release of brake pedal 27 (see FIG. 1) after a stop. In this manner, braking performance is optimized, and the "feel" of the brake pedal 27 closely approximates the motion and feel of a conventional, mechanical braking pedal. The algorithm 100 is preferably executed on a continuous cycle or control loop of approximately 5 to 10 milliseconds, but which may be performed more or less frequently depending on the available speed or power of microprocessor 80 (see FIG. 1).

Beginning with step 102, the algorithm 100 determines whether one or more predetermined braking conditions have occurred within the immediately prior completed control loop. For example, step 102 may determine whether the brake pedal 27 is releasing, and/or whether certain other linearization entrance criteria have been met, as will be described later hereinbelow. Because the algorithm 100 effectively performs linear data fitting or another linearization process to interpolate between the separate force and travel tables 90 and 91, respectively, the flag set at step 102 is referred to in FIG. 2 as a "linear flag". If at step 102 it is determined that the predetermined braking conditions have been met, algorithm 100 proceeds directly to step 114. Otherwise, the algorithm 100 proceeds to step 104.

At step 104, it having been determined in step 102 that predetermined braking conditions have not occurred during the previous control loop, the algorithm 100 uses measurements taken by the travel sensor 41 to determine whether the travel of the brake pedal 27 is decreasing, i.e., is moving in a direction opposite that used to apply the brakes, such as when a driver releases brake pedal 27 after a stop. If brake pedal travel is decreasing, algorithm 100 proceeds to step 106. If not, algorithm 100 proceeds to step 108.

At step 106, it having been determined in step 104 that travel of the brake pedal 27 is decreasing, the algorithm 100 compares the detected force applied to the brake pedal 27, as measured or determined by the force sensor 40, to a calibrated or threshold force value stored in memory 19. This threshold force value is predetermined based on the design criteria of a given vehicle 10, and may be set according to design parameters depending on the available resolution and performance of specific EBS components (such as braking units 30 and/or output member 24) and/or the force sensor 40. If at step 106 it is determined that detected pedal force exceeds the stored threshold force value, algorithm 100 proceeds to step 108. Otherwise algorithm 100 proceeds to step 110.

At step 108, the algorithm 100 proceeds according to a standard or default driver braking request algorithm. Preferably, this standard algorithm entails accessing force table 90 to determine the correct braking torque request ($B_C$) to apply, and then applying the request ($B_C$) to the braking units 30 and/or the output member 24 (see FIG. 1) as needed to slow of stop the vehicle 10. The algorithm 100 will effectively remain in step 108 unless the next control loop detects a different result at step 106.

At step 110, it having been determined in step 106 that the detected braking force is less than the stored threshold braking force, algorithm 100 compares the detected travel position of the brake pedal 27 to a threshold travel value stored in memory 19. If the detected travel position is less than the stored threshold travel position value, algorithm 100 proceeds to step 108 and executes the force table 90 as explained hereinabove. By so doing, the algorithm 100 optimizes the feel of the brake pedal 27, preventing a sudden or abrupt transition to the travel table 91, and any consequent sudden or abrupt application of the braking units 30 and/or braking of the output member 24 (see FIG. 1). If however at step 110 it is determined that detected pedal travel exceeds the stored threshold travel position value, algorithm 100 proceeds to step 112.

At step 112, the algorithm 100 performs a final status check to determine whether the brake request measured at the brake pedal 27 exceeds the corresponding braking torque of the force table 90. Step 112 will normally result in a determination that the two values are indeed equal, as the algorithm 100 at that instant should be operating according to the force table 90, and not according to the travel table 91. If the values are different, however, the algorithm 100 proceeds to step 108 and there executes a standard driver brake request algorithm, which in this instance would be determined by travel table 91. However, if at step 112 it is determined that the values are indeed equal, algorithm 100 proceeds to step 114.

At step 114, the algorithm 100 determines whether the combination of braking force and travel, as determined by the force and travel sensors 40 and 41, respectively, are indicative of an emergency or "panic" braking condition. Measurements indicative of such a condition, and the commanded braking torque request ($B_C$) responsive to the emergency braking condition, are preferably preprogrammed in memory 19 where they are readily accessible by the algorithm 100 in making this determination. If an emergency braking condition is detected, the algorithm 100 proceeds to step 116. Otherwise, the algorithm 100 proceeds to step 118.

At step 116, the algorithm 100 immediately enters or activates the stored emergency or "panic" braking algorithm (not shown) mentioned at step 114. The algorithm 100 is then reinitiated at step 102 when the controller 18 determines that such a condition has ceased, or the vehicle 10 has stopped.

At step 118, it having been determined at step 114 that an emergency or "panic" braking condition does not exist, a force-based request flag is set to zero, thus signaling that the controller 18 will no longer operate according to the force table 90, but will instead begin a transition to the travel table 91. The remaining portion of the algorithm 100 subsequent to step 118 describes the linearization or interpolation between the force table 90 and the travel table 91, with the setting of the force-based request flag to zero in the current step signaling the transition, after which the algorithm 100 proceeds to step 120.

At step 120, a "snapshot" is taken of the current detected force and travel position levels, as measured by the force sensor 40 and the travel sensor 41, respectively. These values are stored or recorded in memory 19. Once complete, the algorithm 100 proceeds to step 122.

At step 122, the algorithm 100 determines whether the stored pedal force (see step 120) corresponds to a braking torque request ($B_C$) that is less than the linearization "exit point" E, as determined at step 120 and shown in FIG. 3. Turning briefly to FIG. 3, this figure is an exemplary line graph describing the interrelation between a force-based brake request curve A, a travel-based brake request curve C, and a separate calculated brake request curve B. Each of the points of curves A and C are taken directly from the previously described force-based and travel position-based lookup tables 90 and 91, respectively, while the points comprising calculated curve B are calculated or interpolated according to the algorithm 100, as described hereinbelow.

Point D is referred to hereinafter as the "entry point", referring to the "entry" onto transition curve B and departure from force-based brake request curve A. Likewise, point E is referred to hereinafter as the "exit point", referring to the "exit" from calculated curve B and onto travel-based brake request curve C. If at step 122 the algorithm 100 determines that the stored pedal force (see step 120) corresponds to a braking torque request ($B_C$) that is less than a linearization "exit point" E, the algorithm 100 proceeds to step 126. Otherwise, the algorithm 100 proceeds to step 124.

At step 124, and turning back to FIG. 2, the algorithm 100 launches a calculated brake request curve B (see FIG. 3), which is an interpolated and linearized transition curve that is fit to and interconnects force curve A and travel curve C. Curve B may be generated using known linear data fitting methods, such as the least squares method or the method of least absolute deviations, with the slope of curve B dependent on entry point D determined by the force captured in step 120, and on the exit point E (see FIG. 3), with exit point E being the corresponding torque point along travel-based brake request curve C, as determined from travel table 91. After completing the linearization process of step 124, the algorithm 100 proceeds to step 128.

In step 126, which is reached upon a determination that the detected pedal force corresponds to a braking torque request ($B_C$) that is less than that corresponding to exit point E (see FIG. 3), the algorithm 100 brakes the vehicle 10 according to travel-based brake request curve C, as determined by the travel table 91. Algorithm 100 remains at step 126 until the following control loop determines a status change, beginning with step 104.

In the remaining steps 128-136, a final portion of the algorithm 100 is used to determine if an operator of the vehicle 10 (see FIG. 1) is reapplying the brake pedal 27. If the brake pedal 27 is being reapplied, the algorithm 100 determines how to proceed.

At step 128, the algorithm 100 performs a simple calculation by subtracting the linearization torque request, i.e., the braking torque request ($B_C$) as determined by the transition curve B (see FIG. 3) during the linearization process performed in step 124, from the corresponding force-based torque request, as determined by the force-based brake request curve A and the force table 90 (see FIG. 1). This difference is compared to a stored threshold difference. If the stored threshold difference is greater than the calculated difference, the algorithm 100 proceeds to step 130, otherwise the algorithm 100 proceeds to step 132.

At step 130, the algorithm 100 "passes" the linearization request, i.e., commands or controls braking of the vehicle 10 according to the linearized or calculated brake request curve B (see FIG. 3). In this manner, the braking torque request ($B_C$) applied to stop or slow the vehicle 10 is exclusively the calculated or interpolated torque request according to calculated brake request curve B. Algorithm 100 remains at step 130 until the following or subsequent control loop detects a status change, beginning with step 104, as discussed previously hereinabove.

In step 132, the algorithm 100 determines whether the travel of brake pedal 27 (see FIG. 1) is increasing, i.e., the brake pedal 27 is being reapplied, as detected by the travel sensor 41. If increasing travel is detected, the algorithm 100 proceeds to step 134. Otherwise, the algorithm 100 proceeds to step 130.

At step 134, the algorithm 100 determines whether the amount of force (arrow A of FIG. 1) applied to the brake pedal 27 exceeds a stored threshold force value. If so, the algorithm 100 determines that the brake pedal 27 is being reapplied rather than released, and proceeds to step 136. Otherwise, the algorithm 100 proceeds to step 130.

At step 136, the algorithm 100 passes the force-based torque request, i.e., actuates the braking units 30 and/or brakes the output member 24 according to force curve A of FIG. 3, as determined by the force table 90 and described previously hereinabove, and remains on force-based brake request curve A until the following or subsequent control loop detects a braking status change, beginning with step 104, as discussed previously hereinabove.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a brake pedal having a detectable travel position and a detectable apply force;
a travel sensor configured to measure the detectable travel position;
a force sensor configured to measure the detectable apply force;
at least one electronic braking system component configured for braking the vehicle in response to at least one of the detectable travel position and the detectable apply force; and
a controller in communication with the travel and force sensors, the controller having a stored threshold apply force, wherein the controller is configured to determine a first braking torque request from a force lookup table solely using the detectable apply force, a second braking torque request from a travel lookup table solely using the detectable travel position, and a third braking force request which selectively transitions from the first braking torque request to the second braking torque request using a linear data fitting operation that interpolates between the force lookup table and the travel lookup table;
wherein the controller is further configured to apply the at least one electronic braking system component using:
the first braking torque request solely from the force lookup table when a detected apply force measured by the force sensor is greater than the stored threshold apply force;
the second braking torque request solely from the travel lookup table when the detected apply force is less than the stored threshold apply force; and
the third braking torque request only upon release of the brake pedal when the detected apply force drops below the threshold apply force to thereby linearly transition from the first braking torque request to the second braking torque request.

2. The vehicle of claim 1, wherein the controller is configured to switch to the second braking torque request from the third braking torque request only when the third braking torque request equals the second braking torque request, thereby smoothly transitioning between the first braking torque request and the second braking torque request.

3. The vehicle of claim 1, wherein the controller is configured to calculate a linearized curve between the first and the second braking torque requests using the linear data fitting operation, and selecting the third braking torque request from the linearized curve.

4. The vehicle of claim 1, wherein the controller is configured to detect a panic braking condition, and for applying the at least one braking component using one of the first and the second braking torque requests only when the panic braking condition has ceased.

5. A brake pedal transition method for use with a hybrid vehicle having at least one electronic braking system (EBS) component and a brake pedal, the method comprising:
  measuring and recording a braking apply force and a travel position of the brake pedal using respective force and travel sensors;
  separately accessing an apply force-based braking torque lookup table and a travel position-based braking torque lookup table, wherein the force-based braking torque lookup table corresponds to a first braking torque request based solely on a recorded braking apply force of the brake pedal, and the travel position-based torque lookup table corresponding to a second braking torque request based solely on a recorded travel position of the brake pedal;
  comparing the recorded braking apply force to a stored threshold braking apply force value of the force sensor;
  linearly interpolating, using a linear data fitting operation, a transition braking torque request which transitions from the force-based braking torque lookup table to the travel position-based torque lookup;
  applying the at least one EBS component using only the force-based lookup table when the applied braking force is greater than the threshold braking force value;
  applying the at least one EBS component using only the travel-based lookup table when the applied braking force is less than the threshold braking force value; and
  applying the at least one EBS component using the interpolated transition braking torque request only upon a release of the brake pedal that causes the applied braking force to drop below the threshold braking force value.

6. The method of claim 5, wherein linearly interpolating a transition braking torque request which transitions from the force-based lookup table to the travel-based lookup table includes generating a linear torque transition curve between a torque value point selected from the force-based braking torque lookup table and a torque value point selected from the travel position-based braking torque lookup table.

7. The method of claim 6, wherein the linear data fitting operation is selected from the group consisting of least squares linearization and least absolute deviations.

8. A method of interpolating a driver-requested braking torque request in a vehicle having at least one electronic braking system (EBS) component with a detectable brake pedal apply force and a detectable brake pedal travel position, the method comprising:
  detecting the brake pedal apply force;
  calculating a first braking torque request using only the brake apply pedal force;
  detecting the brake pedal travel position;
  determining a second braking torque request using only the brake pedal travel position;
  saving the first braking torque request as a linearization entry point for transitioning linearly to the second brake torque request;
  setting a linearization exit point equal to the second braking torque request;
  applying the at least one EBS component using only the first braking torque request when the brake pedal apply force exceeds a calibrated minimum detected brake pedal apply force threshold;
  interpolating, using a linear data fitting operation, a third braking torque request between the linearization entry point and the linearization exit point; and
  applying the at least one EBS component using the third braking torque request only when the detectable brake pedal force drops below a stored threshold value upon release of the brake pedal, and maintaining the third braking torque request until the third braking torque request equals the linearization exit point, thereafter applying the at least one EBS component using only the first braking torque request.

9. The method of claim 8, wherein the linear data fitting operation is to generate a torque transition curve between the first braking torque request and the second braking torque request.

10. The method of claim 9, wherein the linear data fitting operation is selected from the group consisting of least squares linearization and least absolute deviations.

* * * * *